US010872475B2

(12) United States Patent
Aluru et al.

(10) Patent No.: US 10,872,475 B2
(45) Date of Patent: Dec. 22, 2020

(54) 3D MOBILE RENDERER FOR USER-GENERATED AVATAR, APPAREL, AND ACCESSORIES

(71) Applicant: Soul Vision Creations Private Limited, Bangalore (IN)

(72) Inventors: Sravanth Aluru, Bangalore (IN); Gaurav Baid, Bangalore (IN); Sarbartha Sengupta, Bangalore (IN)

(73) Assignee: Soul Vision Creations Private Limited

( * ) Notice: Subject to any disclaimer, the term of this patent is extended or adjusted under 35 U.S.C. 154(b) by 0 days.

(21) Appl. No.: 16/204,934

(22) Filed: Nov. 29, 2018

(65) Prior Publication Data
US 2019/0266778 A1    Aug. 29, 2019

Related U.S. Application Data

(60) Provisional application No. 62/636,157, filed on Feb. 27, 2018.

(51) Int. Cl.
*G06T 15/60* (2006.01)
*G06T 19/20* (2011.01)
(Continued)

(52) U.S. Cl.
CPC .............. *G06T 19/20* (2013.01); *G06F 16/54* (2019.01); *G06F 30/20* (2020.01);
(Continued)

(58) Field of Classification Search
CPC ....... G06T 15/506; G06T 15/50; G06T 15/80; G06T 15/60; G06T 15/06
(Continued)

(56) References Cited

U.S. PATENT DOCUMENTS

| 4,926,344 A | 5/1990 | Collins et al. |
| 6,546,309 B1 | 4/2003 | Gazzuolo |

(Continued)

FOREIGN PATENT DOCUMENTS

| EP | 3234925 A1 | 10/2017 |
| GB | 2488237 A | 8/2012 |

(Continued)

OTHER PUBLICATIONS

Non-Final Office Action from U.S. Appl. No. 16/204,973 dated Oct. 3, 2019 (31 pp.).

(Continued)

*Primary Examiner* — Gordon G Liu
(74) *Attorney, Agent, or Firm* — Shumaker & Sieffert, P.A.

(57) ABSTRACT

This disclosure describes example techniques for personalized virtual look, fit, and animation of apparel, accessories, and cosmetics on a virtual representation of a user. The disclosure describes dividing an image to be rendered into n containers, wherein the image represents an avatar of a user, determining a respective category of content, from among a plurality of categories of content, for each of the n containers, determining a respective shader program for respective containers of the n containers based on the respective category of the respective container, independently rendering the n containers using the determined respective shader programs to create the avatar, and displaying the avatar.

18 Claims, 5 Drawing Sheets

(51) Int. Cl.

| | |
|---|---|
| *G06F 16/54* | (2019.01) |
| *G06K 9/00* | (2006.01) |
| *G06T 15/00* | (2011.01) |
| *G06T 15/04* | (2011.01) |
| *G06T 13/40* | (2011.01) |
| *G06T 17/20* | (2006.01) |
| *G06Q 30/06* | (2012.01) |
| *G06T 17/10* | (2006.01) |
| *G06F 30/20* | (2020.01) |

(52) U.S. Cl.
CPC ..... *G06K 9/00275* (2013.01); *G06K 9/00281* (2013.01); *G06Q 30/0627* (2013.01); *G06T 13/40* (2013.01); *G06T 15/005* (2013.01); *G06T 15/04* (2013.01); *G06T 17/10* (2013.01); *G06T 17/20* (2013.01); *G06T 2210/16* (2013.01)

(58) Field of Classification Search
USPC .......................................................... 345/426
See application file for complete search history.

(56) References Cited

U.S. PATENT DOCUMENTS

| | | | |
|---|---|---|---|
| 2002/0021297 | A1 | 2/2002 | Weaver |
| 2009/0132371 | A1 | 5/2009 | Strietzel et al. |
| 2010/0030578 | A1 | 2/2010 | Siddique et al. |
| 2010/0050088 | A1* | 2/2010 | Neustaedter ............ A63F 13/79 715/745 |
| 2011/0298897 | A1 | 12/2011 | Sareen et al. |
| 2013/0325493 | A1 | 12/2013 | Wong et al. |
| 2014/0160122 | A1 | 6/2014 | Chou |
| 2015/0042663 | A1* | 2/2015 | Mandel .................... G06T 13/80 345/474 |
| 2016/0088284 | A1* | 3/2016 | Sareen .................... G06N 3/006 348/47 |
| 2017/0161948 | A1 | 6/2017 | Hua et al. |
| 2019/0035133 | A1* | 1/2019 | Jiao .......................... G06T 7/251 |
| 2019/0035149 | A1* | 1/2019 | Chen ................. G06K 9/00248 |

FOREIGN PATENT DOCUMENTS

| | | |
|---|---|---|
| JP | 2002024319 A | 1/2002 |
| WO | 2016138481 A1 | 9/2016 |

OTHER PUBLICATIONS

Non-Final Office Action from U.S. Appl. No. 16/204,883 dated Dec. 26, 2019 (17 pp).
Response to Non-Final Office Action from U.S. Appl. No. 16/204,973 dated Oct. 3, 2019 which was filed Jan. 3, 2020 (10 pp).
Abdulla, "Mask R-CNN for Object Detection and Segmentation," GitHub repository, accessed from https://github.com/matterport/Mask_RCNN , 2017, 15 pp. (Applicant points out, in accordance with MPEP 609.04(a), that the year of publication, 2017, is sufficiently earlier than the effective U.S. filing date, so that the particular month of publication is not in issue.).
Chang et al., "Palette-based Photo Recoloring," ACM Transactions on Graphics (Proceedings of SIGGRAPH), vol. 34, No. 4, Jul. 2015, 11 pp.
He et al., "Mask R-CNN," IEEE International Conference on Computer Vision (ICCV), ArXiv, Jan. 2018, 12 pp.
Long et al., "Fully Convolutional Networks for Semantic Segmentation," IEEE International Conference on Computer Vision and Pattern Recognition (CVPR), Mar. 2015, 10 pp.
YouTube, "AVATAAR.ME—Decoded Future: Talk on AR for Fashion," retrieved from https://www.youtube.com/watch?v=uq3PlpBisi4 &feature=youtu.be, uploaded on Jul. 5, 2018 by user AVATAAR ME, 1 pp.
U.S. Appl. No. 16/204,883, filed Nov. 29, 2018, naming inventors Aluru et al.
U.S. Appl. No. 16/204,973, filed Nov. 29, 2018, naming inventors Aluru et al.
Final Office Action from U.S. Appl. No. 16/204,973 dated Feb. 7, 2020 (35 pp).
Response to Non-Final Office Action from U.S. Appl. No. 16/204,883 dated Dec. 26, 2019 which was filed Mar. 26, 2020 (11 pp).
Notice of Allowance from U.S. Appl. No. 16/204,883 dated Apr. 16, 2020 (8 pp).
Response to Final Office Action from U.S. Appl. No. 16/204,973 dated Feb. 7, 2020 which was filed May 7, 2020 (10 pp).
Interview Summary from U.S. Appl. No. 16/204,973 dated May 6, 2020 (3 pp).
Yuan et al., "A Mixed Reality Virtual Clothes Try-On System," IEEE Transaction on Multimedia, vol. 16, No. 1, Jan. 2014, 11 pp.
International Search Report and Written Opinion of International Application No. PCT/IN2019/050142, dated Jun. 14, 2019, 9 pp.

* cited by examiner

3D MOBILE RENDERER FOR USER-GENERATED AVATAR, APPAREL, AND ACCESSORIES

This application claims the benefit of U.S. Provisional Application No. 62/636,157, filed Feb. 27, 2018, the entire contents of which is incorporated herein by reference.

TECHNICAL FIELD

The disclosure relates to computerized virtual representation creation.

BACKGROUND

Online retail and e-commerce are increasingly taking market share from on premise traditional brick and mortar retailers. When shopping at brick and mortar retailers, a customer can try on apparel and accessories to ensure the right fit and style. When shopping online, a customer is limited in his or her ability to ensure the right fit, style, and overall appearance due to the inability to try on the apparel and accessories.

SUMMARY

In general, the disclosure describes example techniques of real-time rendering of virtual representations of a user, so-called avatars, that can be displayed on a personal computing device (e.g., a mobile phone, tablet computer, laptop computer, desktop computer, etc.). In particular, this disclosure describes techniques for the real-time rendering of avatars for fashion-oriented solutions. The techniques of this disclosure may allow for a more optimized rendering of avatars, both in terms of time and responsiveness of the rendering, as well as in the realism of the rendering for fashion-oriented applications.

This disclosure describes a mobile renderer which may be configured to render avatars for fashion-related applications. The mobile renderer may be implemented as software executing on a processor of a personal computing device. The mobile renderer may be configured to divide an image (e.g., an avatar) into multiple containers, each container representing a particular type of content to be displayed (e.g., face, hair, body, garments, accessories, etc.). The containers may also be categorized into one of a plurality of categories (e.g., face, body, face-related accessories, and body-related accessories). The mobile renderer may be configured to cause each of containers to be rendered independently in a specific order.

The mobile renderer may be further configured to determine a particular shader program to use for each of the containers to be rendered. The shader programs may be tailored for each container type in order to provide for greater realism in fashion-related applications. The mobile renderer may also be configured to receive inputs from a user that requests a change to one or more aspects of the avatar. The mobile renderer may be configured to determine one or more containers affected by the requested change, and will cause the affected containers to be re-rendered. In some examples, the mobile renderer is configured to use a rule-based approach to determine a minimum amount of update needed to re-render certain containers based on the change requested by the user and the category of the containers.

In one example, the disclosure describes a method comprising dividing an image to be rendered into n containers, wherein the image represents an avatar of a user, determining a respective category of content, from among a plurality of categories of content, for each of the n containers, determining a respective shader program for respective containers of the n containers based on the respective category of the respective container, independently rendering the n containers using the determined respective shader programs to create the avatar, and displaying the avatar.

In another example, the disclosure describes a system comprising a memory configured to store an image to be displayed, and one or more processors in communication with the memory, the one or processors configured to divide an image to be rendered into n containers, wherein the image represents an avatar of a user, determine a respective category of content, from among a plurality of categories of content, for each of the n containers, determine a respective shader program for respective containers of the n containers based on the respective category of the respective container, independently render the n containers using the determined respective shader programs to create the avatar, and display the avatar.

In another example, the disclosure describes a computer-readable storage medium having instructions stored thereon that when executed cause processing circuitry to divide an image to be rendered into n containers, wherein the image represents an avatar of a user, determine a respective category of content, from among a plurality of categories of content, for each of the n containers, determine a respective shader program for respective containers of the n containers based on the respective category of the respective container, independently render the n containers using the determined respective shader programs to create the avatar, and display the avatar.

In one example, the disclosure describes an apparatus comprising means for dividing an image to be rendered into n containers, wherein the image represents an avatar of a user, means for determining a respective category of content, from among a plurality of categories of content, for each of the n containers, means for determining a respective shader program for respective containers of the n containers based on the respective category of the respective container, means for independently rendering the n containers using the determined respective shader programs to create the avatar, and means for displaying the avatar.

The details of one or more examples are set forth in the accompanying drawings and the description below. Other features, objects, and advantages will be apparent from the description and drawings, and from the claims.

DETAILED DESCRIPTION

Figure 1:
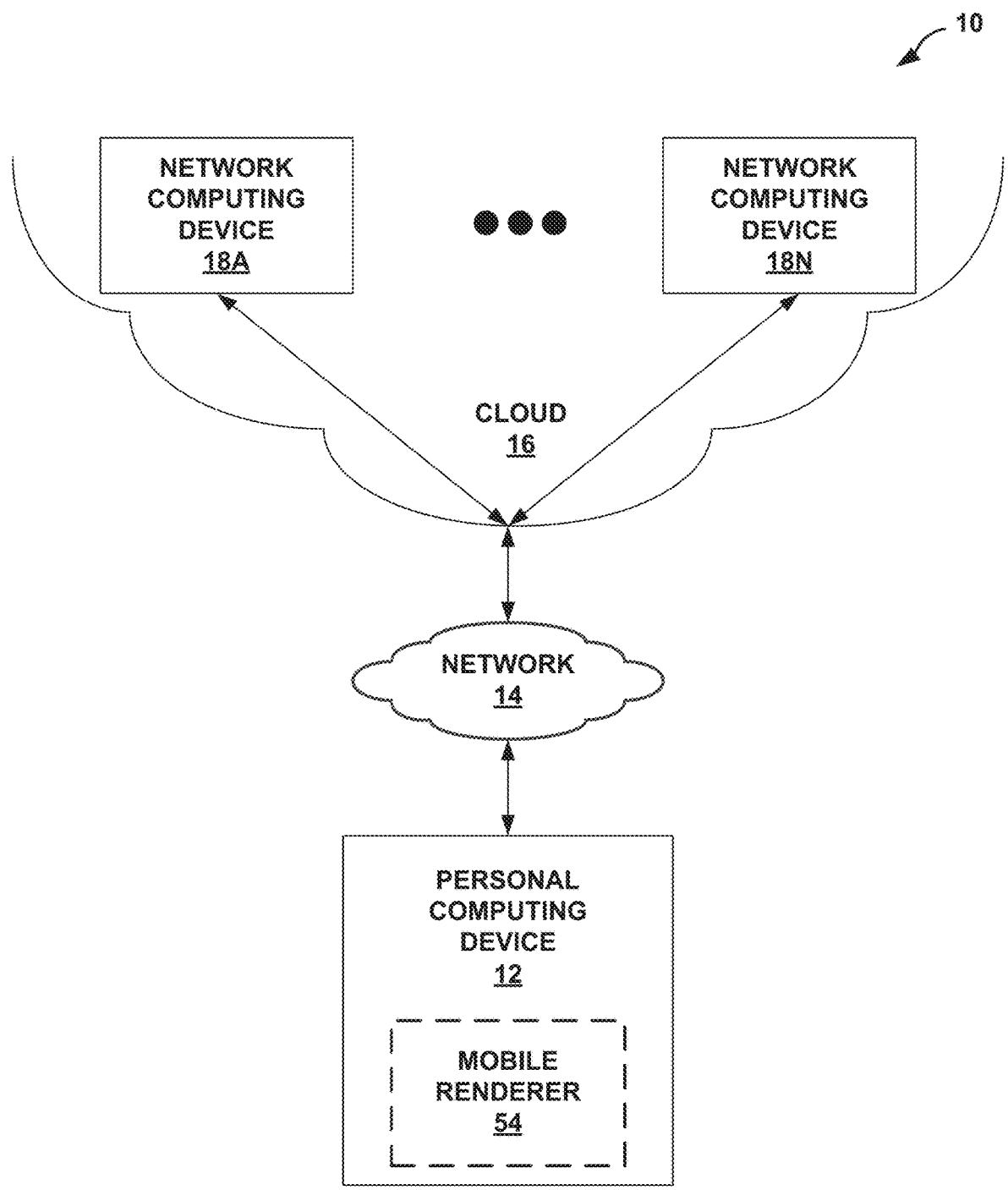
FIG. 1 is a block diagram illustrating a system for creating virtual representations of users in accordance with one or more example techniques described in this disclosure.

Online retail and e-commerce are increasingly taking market share from on premise traditional brick and mortar retailers. However, online shopping experience, especially in fashion—apparels, accessories, beauty and personal care—has drawbacks as compared to experience in a physical store. In some cases, consumers discover and purchase fashion products online by evaluating static two-dimensional (2D) images of the fashion products on brand ambassadors or models. There is no ability for them to try before they buy as in a physical store and nor is it personalized to them.

There are some online virtual try-on experiences, but the options are limited. Virtual try-on means a user viewing how a virtual representation of an apparel or accessory would look when worn by the user. Some virtual try-on experiences are not personalized. Virtualized accessories and apparel cannot be displayed together, and these techniques are not well suited for real-time rendering on personal computing devices, such as mobile devices (e.g., smart phones or tablets) or laptops, on which may users view and purchase apparel and accessories.

Furthermore, some example rendering systems for generating image content for display are geared toward gaming-oriented application. Such gaming-oriented rendering systems may provide for sub-optimal realism when used for fashion-related applications. Some existing rendering systems may provide for inadequate responsiveness when changes are requested by a user (e.g., a request to display a different garment or accessory on the avatar). This is because existing rendering systems may be configured to re-render the entire scene when a change is requested.

Other currently available renderers support generic solutions and optimizations to render objects within a generic set of environments. Such solutions may be heavy (i.e., complex to implement) and less responsive to real-time content switching by user interaction. Also, such generic systems are configured in a generic environment to support every kind of object. This generic design may compromise the realism of apparel and user-generated faces.

In view of these drawbacks, this disclosure describes techniques for the real-time rendering of avatars for fashion-oriented solutions. The techniques of this disclosure may allow for a more optimized rendering of avatars, both in terms of time and responsiveness of the rendering, as well as in the realism of the rendering for fashion-oriented applications. The techniques of this disclosure include a container-based customized solution to render realistic apparel as well as accurate avatars created by the user using customized shaders and container-based real-time context switching to support mix and match of apparels and accessories. Avatars are examples of virtual representations of the user.

In general, this disclosure describes example techniques to generate a virtual representation (e.g., avatar) of a user in real-time, as well as virtual representations of apparel and accessories in real-time, so that the user can determine the fit and style of the apparel and accessories (e.g., determine how the apparel and accessories appear on his or her body). As will be described in more detail below, this disclosure describes a mobile renderer which may be configured to render avatars for fashion-related applications. The mobile renderer may be implemented as software executing on a processor of a personal computing device. The mobile renderer may be configured to divide an image (e.g., an avatar) into multiple containers, each container representing a particular type of content to be displayed (e.g., face, hair, body, garments, accessories, etc.). The containers may also be categorized into one of a plurality of categories (e.g., face, body, face-related accessories, and body-related accessories). The mobile renderer may be configured to cause each of containers to be rendered independently in a specific order. In this regard, independent rendering may refer to rendering the image content in each of the containers separately (i.e., without rendering the content of other containers). However, it should be understood that the depth and/or transparency values of the output of the different rendered containers may compared with each other to determine what output is "on top" of the other and will actually be visible in the final scene. In this regard, the techniques of this disclosure may generally render containers that are behind other containers first.

The mobile renderer may be further configured to determine a particular shader program to use for each of the containers to be rendered. The shader programs may be tailored for each container type in order to provide for greater realism in fashion-related applications. The mobile renderer may also be configured to receive inputs from a user that requests a change to one or more aspects of the avatar. The mobile renderer may be configured to determine one or more containers affected by the requested change, and cause the affected containers to be re-rendered. In some examples, the mobile renderer is configured to use a rule-based approach to determine a minimum amount of update needed to re-render certain containers based on the change requested by the user and the category of the containers. The renderer described in this disclosure is lightweight (e.g., less complex to implement) for fashion-related objects which enhance fashion realism along with the responsiveness desired from frequent content switches via user action.

FIG. 1 is a block diagram illustrating a system 10 for creating virtual representations of users in accordance with one or more example techniques described in this disclosure. As illustrated, system 10 includes personal computing device 12, network 14, and cloud 16. Cloud 16 includes network computing devices 18A-18N (collectively referred to as "network computing devices 18").

Examples of personal computing device 12 include mobile computing devices (e.g., tablets or smartphones), laptop or desktop computers, e-book readers, digital cameras, video gaming devices, and the like. In one or more examples, a user of personal computing device 12 may shop for apparel and accessories online. For example, the user may access online retailers and browse through their items to identify apparel or accessories to purchase. In some examples, the user of personal computing device 12 may be scrolling through content from various websites, and some apparel or accessories may pique his or her interest.

The user may be interested in determining whether to purchase the item or not but may not have access to a retailer where he or she can try on the item for fit and style. In some cases, even where retailer access is available, the user may desire to make more of an on-the-spot determination of whether the item will look satisfactory when worn. Moreover, the user may wish to ask friends and family of their opinion and taking everyone to the retailer may not be practical.

In the example techniques described in this disclosure, the user may create a virtual representation of himself or herself via personal computing device 12. The user may use the virtual representation to virtually try-on apparels and accessories to determine whether the style and fit is one he or she would want. The user may also be able to share (e.g., via social media or some other form) the virtual representation with the virtual apparels and accessories with friends and family to solicit opinions.

For determining the style and fit of the apparel and accessories, it may be possible that the user will cycle through many options or try many different combinations. To ensure high quality interaction, the user may desire that the virtual representation is created relatively quickly (e.g., in run-time). As described in more detail, this disclosure describes techniques to create such virtual representations in run-time allowing for the user to quickly view the apparel and accessories.

To create the virtual representation, the user may take an image of himself or herself (e.g., a selfie). The image should include the face of the user, and can include other body parts as well. In some examples, rather than taking the image, the user may retrieve a previously stored image. For example, the user may either take a picture using his or her camera or use an already existing picture which has a frontal snapshot of the user's face. This can either be a 2D image, taken from a regular camera on mobile, desktop, etc., or a 3D depth image, taken from a 3D depth sensing camera.

The user may upload the image of the face of the user to one or more network computing devices 18 for further processing. In addition, the user may upload body type information, or upload images that show the body to one or more network computing devices 18 for further processing. One or more network computing devices 18 may generate a virtual representation (e.g., avatar) of the user based on the image and the body type information. For example, network computing devices 18 may provide responsive real-time cloud services that can, on a responsive real-time basis, generate custom 3D virtual representations (e.g., avatars) using a 2D frontal face selfie or using a 3D depth camera image of the frontal face along with a few body measurements or full body pictures which can be used to programmatically approximate user body measurements provided by the user.

As illustrated, network computing devices 18 are within cloud 16. Cloud 16 represents a cloud infrastructure that supports multiple network computing devices 18 on which applications or operations requested by one or more users run. For example, cloud 16 provides cloud computing for using network computing devices 18, hosted on network 14, to store, manage, and process data, rather than at personal computing device 12.

Network 14 may transport data between network computing devices 18 of cloud 16 and personal computing device 12. For example, network 14 may form part a packet-based network, such as a local area network, a wide-area network, or a global network such as the Internet. Network 14 may include routers, switches, base stations, or any other equipment that may be useful to facilitate data between personal computing device 12 and network computing devices 18.

Examples of network computing devices 18 include server devices that provide functionality to personal computing device 12. For example, network computing devices 18, in cloud 16, may share data or resources for performing computations for personal computing device 12. As one example, network computing devices 18 may be computing servers, but the example techniques are not so limited. Network computing devices 18 may be a combination of computing servers, web servers, database servers, and the like.

For example, network computing devices 18 may host an application, executing on processing circuitry, via which network computing devices 18 receive the image uploaded by the user and the body type information (e.g., as images or user input). The processing circuitry encompasses the processing circuitry of one or more of network computing devices 18 that together perform the example techniques described in this disclosure.

The processing circuitry of network computing devices 18 may determine key features on the face of the user from the image and determine 3D facial shape contours to estimate the face shape and contour of the user. Based on the facial shape contours, the processing circuitry of network computing devices 18 may determine deformations to apply to a default deformable 3D face model (referred to as a frontal contour). By deforming the frontal contour based on the determined deformations, the frontal contour can be formed to appear like the head of the user.

For example, the frontal contour may be a 3D mesh of primitives that looks like a human head. Network computing devices 18 may store information of the 3D mesh of primitives, such as vertices of the primitives and interconnection information. The deformations that the processing circuitry of network computing devices 18 determine may be how to shift and adjust the primitives within the 3D mesh of the frontal contour so that deformed frontal contour appears like the head of the user.

The processing circuitry of network computing devices 18 may deform the frontal contour based on the determined deformation; however, in some examples, for reasons described in more detail below, the processing circuitry may avoid deforming a neck seam of the frontal contour. For example, the processing circuitry may not deform the base of the neck (e.g., neck seam). The processing circuitry may apply deformations to a neck portion of the frontal contour. The processing circuitry may apply slight deformation closer to the neck seam and gradually increase the deformations applied for higher portions of the neck.

In addition to the deformations, the processing circuitry may be configured to select a body type of the user based on the user provided body type information. Examples of the body type information include height, waist, bust, hip, and/or weight measurements, and/or visual body type selection such as apple, pear, rectangle, etc. These measurements may be adequate from a fit perspective for standard machine-manufactured apparel as the apparel is designed on similar body types. There may be more or fewer examples of body type information that the user provides, and the examples are not limited to the above examples.

In some examples, the processing circuitry may deduce the body type information from full body pictures provided by the user. This may help the user avoid having to enter measurements. However, as users are likely to wear different sizes of apparels in different pictures (e.g., some loose; some tight fitting), the user may need to provide multiple pictures for the processing circuitry to determine an accurate estimation of user body measurements.

The processing circuitry may use the body type information to select a body type that is the best fit for the user. For example, network computing devices 18 may store information for a plurality of body types (e.g., different shapes and sizes of bodies). The body types that network computing devices store may be virtualized body types. Based on the body type information, the processing circuitry may determine which of the plurality of body types is the closest match.

For example, the processing circuitry may determine the nearest virtual body type match of the body measurements from a database of pre-modelled 3D body avatars without face or neck (e.g., a database of a plurality of virtualized body types). The processing circuitry may match the measurements and anthropometric ratios provided by the user vis-à-vis the measurements and anthropometric ratios of the virtualized body types.

By separating out the forming of the face portion of the user from the body creation, the processing circuitry may be configured to generate the graphical representation more quickly than some other techniques to achieve the real-time rendering of the graphical representation. For example, it may be possible for the user to take an image of the entire body and face and upload that image. Network computing devices 18 may then determine deformations for the entire body and face based on the image and deform a mesh of primitives that represents the entire human body. However, performing such operations on the entire body of the user may be complex and time consuming. In one or more example techniques, network computing devices 18 may apply deformations on the head portion and select a body type from pre-generated and stored virtualized body types, rather than determine and apply deformations to the body to create the virtual representation of the user.

Accordingly, there may be technical advantages with the example techniques to achieve run-time virtual representation creation. However, some additional technical solutions may be needed to achieve the technical advantages. For example, because the head portion of the user is separated formed than the body portion, when rendering the head portion and the body portion together to form the virtual representation, there may be distortions.

In one or more examples, the plurality of pre-generated and stored virtualized body types may be pre-generated such that the top of the body types substantially aligns (e.g., such that there is minimal distortion) with the neck seam of the frontal contour before any deformations. To ensure that the alignment between the neck seam of the frontal contour and the top of the plurality of body types persists after deformation of the head portion of the frontal contour, the processing circuitry of one or more network computing devices 18 may not (e.g., may avoid) deforming the neck seam of the frontal contour. Again, the neck seam is at the base of the neck and stops near the beginning of the clavicle. However, the neck seam may include more or less anatomical portions of the body.

By avoiding the deformation of the neck seam, the processing circuitry may ensure that prior to and post deformation of the head portion of the frontal contour, the deformed frontal contour will still substantially align with the selected body type. As the processing circuitry moves up the neck seam along the neck portion of the frontal contour, the processing circuitry may apply deformation to the neck portion of the frontal contour.

With the deformed frontal contour and the selected body type, the processing circuitry of network computing devices 18 may render the deformed frontal contour with the selected body type by aligning the body type with the neck seam of the deformed frontal contour to create the virtual representation of the user. For example, the processing circuitry may determine the vertices of the primitives that form the neck seam on the deformed frontal contour and blend those vertices of the primitives that form the top of the body type to form a unitary structure that is the virtual representation of the user.

The processing circuitry may then output graphical information based on the virtual representation of the user to personal computing device 12. Personal computing device 12 may then display the virtual representation of the user. In some examples, the user, via personal computing device 12, may have selected a virtual apparel that he or she wants to try, and the processing circuitry may render the virtual apparel on top of the virtual representation of the user so that the user can see the style and fit of the apparel. In some examples, personal computing device 12 may be configured to separately receive the virtual representation and the virtual apparel, and personal computing device 12 may render the virtual apparel on the virtual representation.

In addition to apparel, the user may be also be able to select different accessories (e.g., hairstyles, earrings, sunglasses, etc.) and cosmetics (e.g., lipsticks, eye liners, etc.). For example, one a user creates his or her own virtual representation, the user can request to visualize a 3D accessory or cosmetics on the virtual representation. Given the user requests this in real-time basis, the processing circuitry of network computing devices 18 may need to deliver a virtual 3D model for the accessories and cosmetic products in real-time basis.

Moreover, the virtual 3D model of the accessories and cosmetic products should be sized and shaped to properly fit the virtual representation. In one or more examples, network computing devices 18 store the virtual 3D model of the accessories and the cosmetic products as they would appear on the frontal contour, prior to any deformation. The processing circuitry may store information indicative of the deformation applied to the frontal contour. The processing circuitry may determine the deformation to apply to the virtual 3D model of the accessories and cosmetic products based on the information indicative of the deformation applied to the frontal contour so that the virtual 3D model of the accessories and cosmetic products scale with the deformations applied to the frontal contour and the virtual 3D model of the accessories and cosmetic products aligns properly on the virtual representation of the user.

Once the virtual representation is created, personal computing device 12 may be configured to render the virtual representation (e.g., the avatar) for display on personal computing device 12. As will be explained in more detail below, personal computing device 12 may be configured to execute mobile renderer 54. Mobile renderer 54 may be configured to render a virtual representation created in the manner described above, or some other avatar of a user (e.g., a predetermined default avatar). In accordance with the techniques of this disclosure, mobile renderer 54 may be configured to divide an image to be rendered into n containers, wherein the image represents an avatar of a user, determine a respective category of content, from among a plurality of categories of content, for each of the n containers, determine a respective shader program for respective containers of the n containers based on the respective category of the respective container, independently render the n containers using the determined respective shader programs to create the avatar, and display the avatar.

Figure 2:
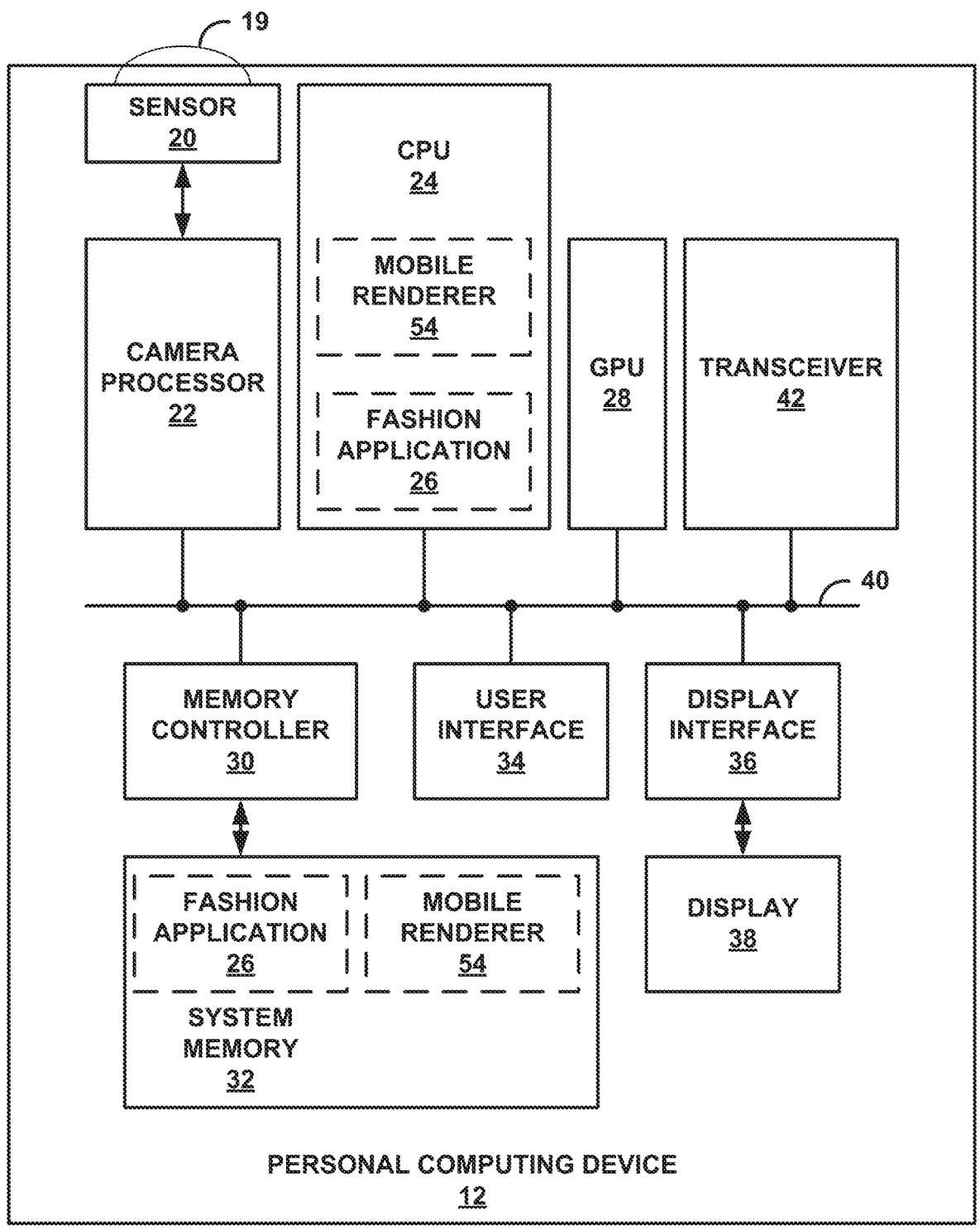
FIG. 2 is a block diagram illustrating an example of a personal computing device configured to display virtual representations of users in accordance with one or more example techniques described in this disclosure.

FIG. 2 is a block diagram illustrating an example of a personal computing device configured to display virtual representations of users in accordance with one or more example techniques described in this disclosure. Examples of personal computing device 12 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA). Additional examples of person computing device 12 include a personal music player, a video player, a display device, a camera, a television, or any other type of device that processes and/or displays graphical data.

As illustrated in the example of FIG. 2, personal computing device 12 includes lens 19 coupled to sensor 20, camera processor 22, a central processing unit (CPU) 24, a graphical processing unit (GPU) 28, memory controller 30 that provides access to system memory 32, user interface 34, and display interface 36 that outputs signals that cause graphical data to be displayed on display 38. Personal computing device 12 also includes transceiver 42, which may include wired or wireless communication links, to communicate with network 14 of FIG. 1. Although FIG. 2 illustrates lens 19 as part of the same device that includes GPU 28, the techniques described in this disclosure are not so limited. Moreover, the shape and configuration of lens 19 is illustrated as one example, and should not be considered limiting.

Also, although the various components are illustrated as separate components, in some examples the components may be combined to form a system on chip (SoC). As an example, camera processor 22, CPU 24, GPU 28, and display interface 36 may be formed on a common integrated circuit (IC) chip. In some examples, one or more of camera processor 22, CPU 24, GPU 28, and display interface 36 may be in separate IC chips. Various other permutations and combinations are possible, and the techniques should not be considered limited to the example illustrated in FIG. 2. The various components illustrated in FIG. 2 (whether formed on one device or different devices) may be formed as at least one of fixed-function or programmable circuitry such as in one or more microprocessors, application specific integrated circuits (ASICs), field programmable gate arrays (FPGAs), digital signal processors (DSPs), or other equivalent integrated or discrete logic circuitry.

The various units illustrated in FIG. 2 communicate with each other using bus 40. Bus 40 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 2 is merely exemplary, and other configurations of computing devices and/or other image processing systems with the same or different components may be used to implement the techniques of this disclosure.

Camera processor 22 is configured to receive the electrical currents as sensor signals from respective pixels of sensor 20 and process the electrical currents to generate pixel data of images. In some examples, camera processor 14 may be configured as a single-input-multiple-data (SIMD) architecture. Camera processor 14 may perform the same operations on current received from each of the pixels on sensor 20. Each lane of the SIMD architecture may include an image pipeline. The image pipeline includes hardwire circuitry and/or programmable circuitry (e.g., at least one of fixed-function or programmable circuitry) to process the output of the pixels.

Camera processor 22 outputs the resulting images (e.g., pixel values for each of the image pixels) to system memory 32 via memory controller 30. As described in more detail, in response to a user executing fashion application 26, personal computing device 12 may upload the image to one or more network devices 18 for creating virtual representations of the user.

CPU 24 may be a general-purpose or a special-purpose processor that controls operation of personal computing device 12. A user may provide input to personal computing device 12 to cause CPU 24 to execute one or more software applications. The software applications that execute on CPU 24 may include, for example, fashion application 26 and mobile renderer 54, as will be described in more detail below. In the example of FIG. 2, CPU 24 is configured to execute mobile renderer 54. However, in other applications, GPU 28 or other processing circuitry may be configured to execute mobile renderer 54. A user may provide input to personal computing device 12 via one or more input devices (not shown) such as a keyboard, a mouse, a microphone, touchscreen, a touch pad or another input device that is coupled to personal computing device 12 via user interface 34. In some examples, such as where personal computing device 12 is a mobile device (e.g., smartphone or tablet), user interface 34 may be part of display 38.

Display 38 may include a monitor, a television, a projection device, a liquid crystal display (LCD), a plasma display panel, a light emitting diode (LED) array, electronic paper, a surface-conduction electron-emitted display (SED), a laser television display, a nanocrystal display or another type of display unit. Display 38 may be integrated within personal computing device 12. For instance, display 38 may be a screen of a mobile telephone handset or a tablet computer. Alternatively, display 38 may be a stand-alone device coupled to personal computing device 12 via a wired or wireless communications link. For instance, display 38 may be a computer monitor or flat panel display connected to a personal computer via a cable or wireless link.

Camera processor 22, CPU 24, and GPU 28 may store image data, and the like in respective buffers that are allocated within system memory 32. Display interface 36 may retrieve the data from system memory 32 and configure display 38 to display the image represented by the generated image data. In some examples, display interface 36 may include a digital-to-analog converter (DAC) that is configured to convert the digital values retrieved from system memory 32 into an analog signal consumable by display 38. In other examples, display interface 36 may pass the digital values directly to display 38 for processing.

For ease of description, one or more examples are described with user interface 34 being part of display 38 (e.g., where display 38 is a touchscreen). However, the example techniques should not be considered limited to such examples.

Memory controller 30 facilitates the transfer of data going into and out of system memory 32. For example, memory controller 30 may receive memory read and write commands, and service such commands with respect to memory 32 in order to provide memory services for the components in personal computing device 12. Memory controller 30 is communicatively coupled to system memory 32. Although memory controller 30 is illustrated in the example of personal computing device 12 of FIG. 2 as being a processing circuit that is separate from both CPU 28 and system memory 32, in other examples, some or all of the functionality of memory controller 30 may be implemented on one or both of CPU 24 and system memory 32.

System memory 32 may store program modules and/or instructions and/or data that are accessible by camera processor 22, CPU 24, and GPU 28. For example, system memory 32 may store user applications (e.g., fashion application 26 and mobile renderer 54), resulting images from camera processor 22, rendered image content from GPU 28, etc. System memory 32 may additionally store information for use by and/or generated by other components of personal computing device 12. System memory 32 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 32 may include instructions that cause camera processor 22, CPU 24, GPU 28, and display interface 36 to perform the functions ascribed to these components in this disclosure. Accordingly, system memory 32 may be a computer-readable storage medium having instructions stored thereon that, when executed, cause one or more processors (e.g., camera processor 22, CPU 24, GPU 28, and display interface 36) to perform various functions.

In some examples, system memory 32 is a non-transitory storage medium. The term "non-transitory" indicates that the storage medium is not embodied in a carrier wave or a propagated signal. However, the term "non-transitory" should not be interpreted to mean that system memory 32 is non-movable or that its contents are static. As one example, system memory 32 may be removed from personal computing device 12, and moved to another device. As another example, memory, substantially similar to system memory 32, may be inserted into personal computing device 12. In certain examples, a non-transitory storage medium may store data that can, over time, change (e.g., in RAM).

As illustrated, one example of the software application that CPU 24 executes is fashion application 26. The user may see a thumbnail indication of fashion application 26 on display 38, and when the user wants to interact with fashion application 26 (e.g., such as when the user wants to determine fit and style of apparel or accessories), the user touches the thumbnail to execute fashion application 26 on CPU 24. CPU 24 may also execute mobile renderer 54 in order to render the avatar for display on personal computing device 12. As will be explained in more detail below, mobile renderer 54 may be further configured to receive inputs from a user and re-render one or more portions (e.g., containers) of the avatar based on changes requested from the user input. In some examples, mobile renderer 54 may be part of fashion application 26. In other examples, fashion application 26 may be configured to call mobile renderer 54.

In response to executing fashion application 26, the user may be prompted, via display 38, to take an image of himself or herself (e.g., a selfie). The user may then take the selfie, ensuring that his or her face is visible. For instance, in response to interacting with the prompts provided on display 38, lens 19 and sensor 20 capture a selfie of the user that camera processor 22 process and display 38 displays within the graphical interface generated by the execution of fashion application 26. Rather than or in addition to taking a selfie, display 38, responsive to the execution of fashion application 26, may instruct the user to retrieve a pre-stored selfie from system memory 32.

In some examples, display 28, responsive to the execution of fashion application 26, may prompt the user to input body type information such as one or more of waist, height, bust, body shape, and the like. The waist, height, bust, and body shape are examples of body type parameters, and there may be additional examples of body type parameters. In some examples, in addition to or instead of inputting body type information, the user may take additional selfies that capture the full body of the user, from which body type information may be determined.

CPU 24, via execution of fashion application 26 and/or mobile renderer 54, may cause transceiver 42 to output the image (e.g., selfie image) and the user inputted body type information and/or the body image to one or more network computing devices 18 for network computing devices 18 to create a virtual representation of the user, in accordance with one or more example techniques described in this disclosure. In addition, fashion application 26 may allow the user to select, via display 38, apparels and accessories that the user may want to virtually try-on to see the style and fit. CPU 24, via execution of fashion application 26, may cause transceiver 42 to also output information of the apparels and accessories.

In one example, one or more network computing devices 18 may create the virtual representation of the user using the example techniques described in this disclosure and output graphical information of the virtual representation to personal computing device 12. In some examples, mobile renderer 54 may be configured to render the virtual representation created by the one or more network computing devices 18. In other examples, mobile renderer 54 may be configured to generate the virtual representation of the user itself or to generate a default, generic virtual representation. In one example of the disclosure, mobile renderer 54 may be configured to generate a series of commands and data (e.g., rendering commands that include shaders, vertices, color information, and other data used to render the virtual representation) for how GPU 28 is to render the virtual representation. In other examples, CPU 24 itself may be configured to render the virtual representation.

In some examples, the rendering commands may conform to a graphics application programming interface (API), such as, e.g., an Open Graphics Library (OpenGL®) API, OpenGL® 3.3, an Open Graphics Library Embedded Systems (OpenGL ES) API, an OpenCL API, a Direct3D API, an X3D API, a RenderMan API, a WebGL API, or any other public or proprietary standard graphics API. The techniques should not be considered limited to requiring a particular API.

GPU 28 receives the rendering commands and data, and, in response, GPU 28 performs the operations defined by the commands on the received data to render the virtual representation of the user, possibly with the virtual apparel and accessories visible to the user. GPU 28 stores the graphical data as the result of the rendering in system memory 32, and display interface 36 retrieves the graphical data for display on display 38.

In some examples, the user requests movement or some form of animation of the virtual representation from the interface provided by fashion application 26. In response, CPU 24, via fashion application 26 and/or mobile renderer 54, may request network computing devices 18 to render frames having the different movement (e.g., generate frames at 30 frames-per-second (fps)), and display 38 may display the frames at the frame rate to show smooth movement. In some examples, GPU 28 renders frames at 30 fps to animate the movement and cause display 38 to display the animation.

Moreover, display 38, via execution of fashion application 26 and/or mobile renderer 54, displays options for the user to request new apparel or accessories. In response, CPU 24, via execution of fashion application 26 and/or mobile renderer 54, causes transceiver 42 to output information of the requested apparel or accessories. Transceiver 42 receives graphical information for the newly requested apparel or accessories, and GPU 28 renders the virtual representation with the newly requested apparel or accessories.

In this way, the example techniques describe an immersive experience for the user to determine the style and fit of an apparel or accessory without needing to physically try it on. As described, the user may desire to view the apparel and accessory on the virtual representation in run-time (e.g., real-time) so that the user can quickly determine whether to try on different apparel or accessories. Accordingly, network computing devices 18 may be configured to generate the graphical information in run-time so that personal computing device 12 can display the virtual representation and apparel and accessories in run-time. In other examples, personal computing device 12, executing mobile renderer 54, may be configured to render and display virtual representations (e.g., avatars) itself.

In one example, via the execution of fashion application, the user may be able to perform various tasks to determine the style and fit. Accordingly, this disclosure describes techniques to provide consumers an immersive end to end personalized 3D experience for fashion discovery and commerce on mobile. The immersive personalized 3D experience may start with the consumer or user creating a realistic 3D avatar of themselves in a few seconds with a simple 2D selfie, two core measurements, height, waist and two additional measurements, either bust, hip or weight and body shape which can be chosen from a visual.

During execution of fashion application 26, the user is provided guidance and cues to get the selfie right and a realistic avatar (e.g., virtual representation). The avatar created by the user can be edited to further customize and personalize. With the 3D avatar created, the user can then use a marketplace (e.g., as provided by execution of fashion application 26) to find apparel, accessories, beauty and personal care products from different vendors and add it to the virtual fitting room for look and fit evaluation. Users, via fashion application 26, can also search for related items based on an existing image of an apparel or a picture taken of the apparel. The closest match found can be added to the fitting room for look and fit evaluation.

User can then evaluate and compare the apparel in a virtual fitting room, displayed via execution of fashion application 26, for look and fit by just toggling apparel in the fitting room swatch and experience a full makeover with accessories, beauty and personal care products. Users can also place themselves in different environment settings like a town square to get a realistic sense of look and fit. Users can share their avatars with the full makeover with their friends and family for comments and feedback and complete their purchase with the shopping cart.

In some examples, of the disclosure, mobile renderer 54 may be configured to divide an image (e.g., an avatar) into multiple containers, each container representing a particular type of content to be displayed (e.g., face, hair, body, garments, accessories, etc.). The containers may also be categorized into one of a plurality of categories (e.g., face, body, face-related accessories, and body-related accessories). Mobile renderer 54 may be configured to cause each of containers to be rendered (e.g., by GPU 28) independently in a specific order.

Mobile renderer 54 may be further configured to determine a particular shader program to use for each of the containers to be rendered. The shader programs may be tailored for each container type in order to provide for greater realism in fashion-related applications. Mobile renderer 54 may also be configured to receive inputs from a user that requests a change to one or more aspects of the avatar. Mobile renderer 54 may be configured to determine one or more containers affected by the requested change, and cause the affected containers to be re-rendered. In some examples, Mobile renderer 54 is configured to use a rule-based approach to determine a minimum amount of update needed to re-render certain containers based on the change requested by the user and the category of the containers.

Figure 3:
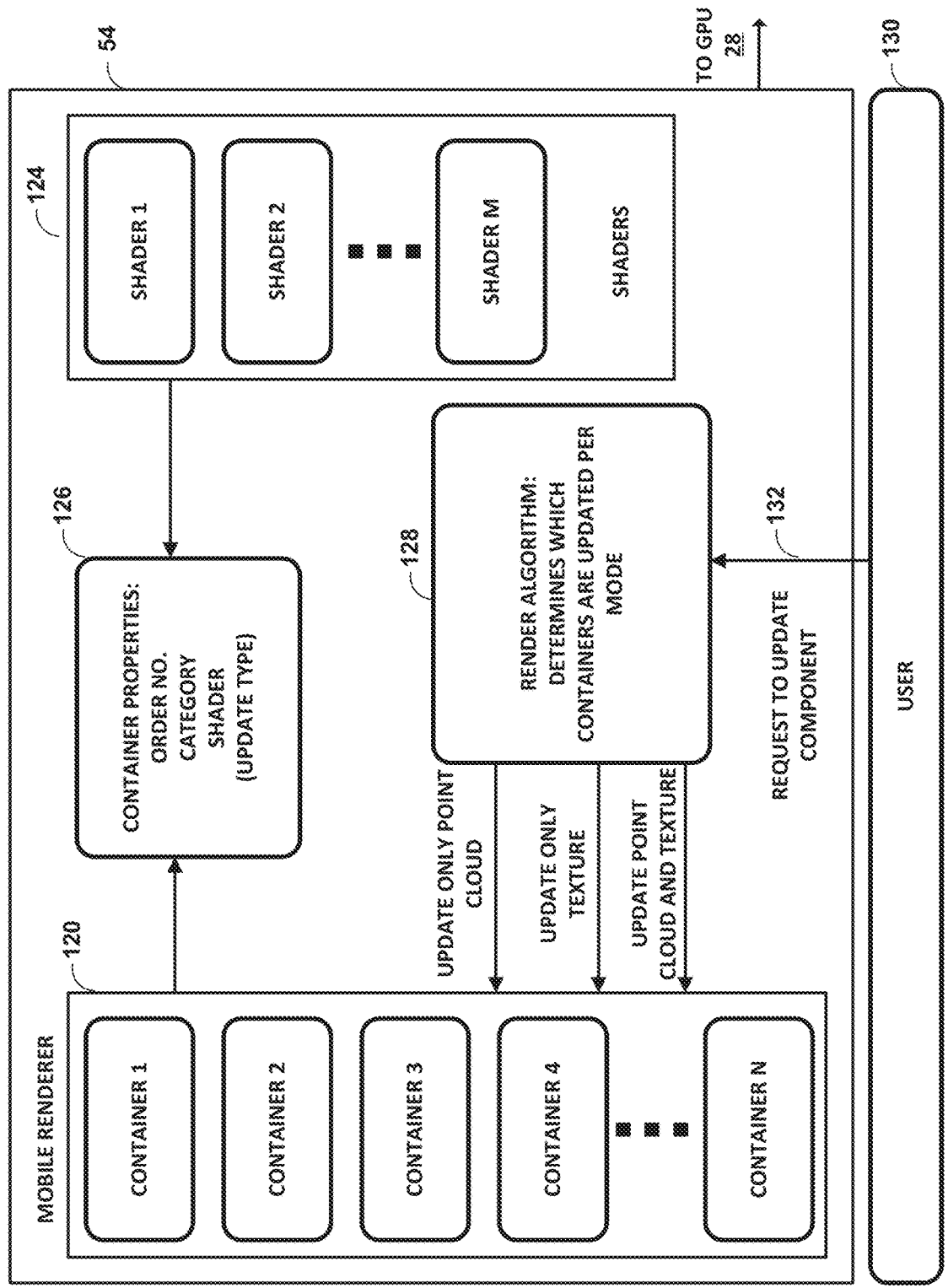
FIG. 3 is a flow diagram illustrating the operation of a mobile renderer according to one example of the disclosure.

FIG. 3 is a flow diagram illustrating the operation of a mobile renderer according to one example of the disclosure. As described above, mobile renderer 54 may be implemented as software that is executable by CPU 24 of personal computing device 12. In other examples, mobile renderer 54 may be implemented as software that is executable by GPU 28. In other examples, mobile renderer 54 may be implemented as two or more software libraries that are executable by one or more different processors (e.g., CPU 24, GPU 28, or another processor). In other examples, mobile renderer 54 may be implemented as any combination of hardware, software, and/or firmware. One goal of mobile renderer 54 is to support real-time mix and match of apparels, accessories, avatars, and bodies, as per user action, without compromising the fashion realism on the overall environment.

Figure 4:
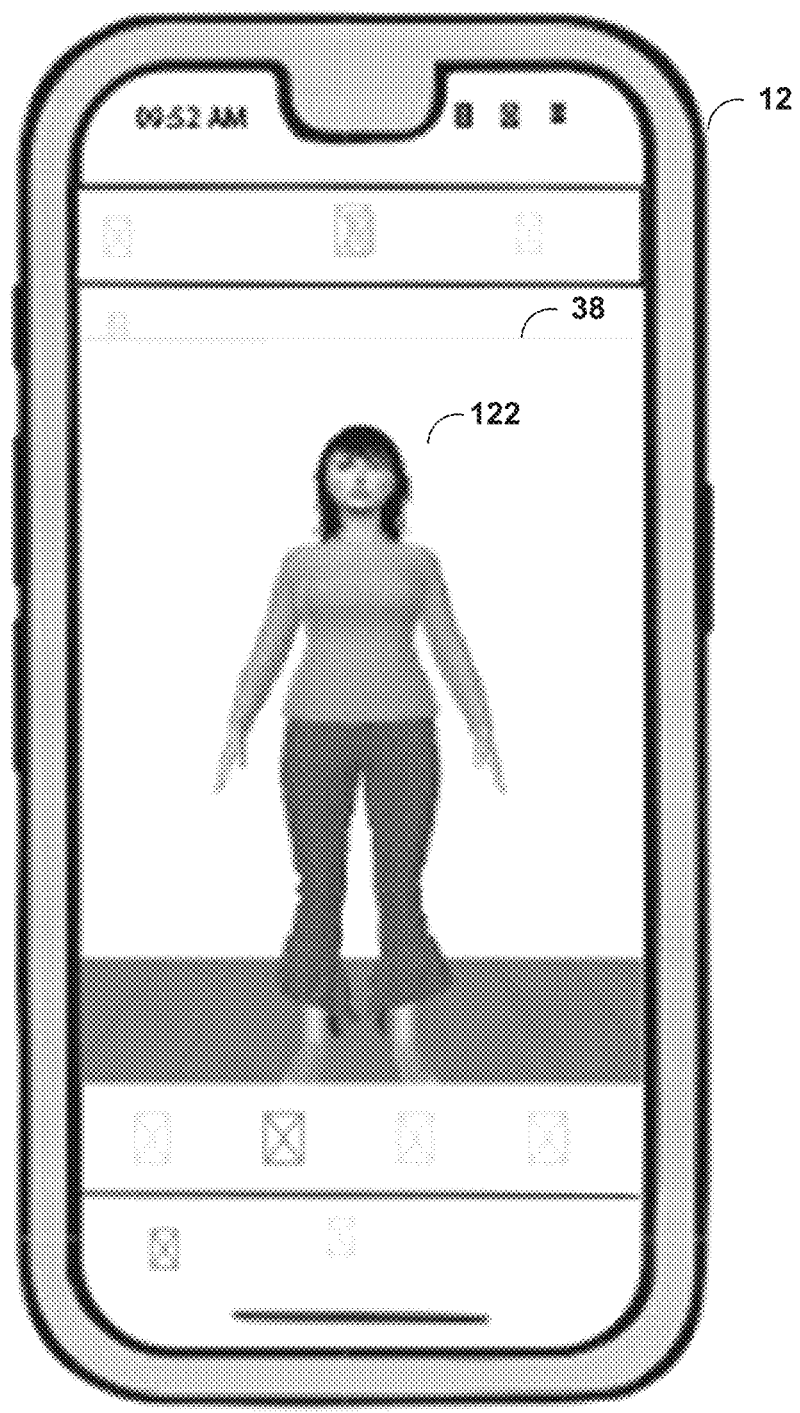
FIG. 4 is a conceptual diagram showing an example avatar according to one example of the disclosure.

As shown in FIG. 3, mobile renderer 54 may be configured to divide an image to be rendered into n containers 120 (container 1, container 2, container 3, container 4 . . . , container n), wherein the image represents an avatar of a user. In this context, the image (e.g., an avatar) may include a plurality of three-dimensional (3D) objects. Mobile renderer 54 divides the entire point cloud of the image (e.g., avatar) into different containers to be rendered, where where each container holds different properties. For example, mobile renderer 54 may divide the image (avatar) into the following containers: face, body, hair, eye-ware, earring, top, bottom, jacket, dress, legs, shoes, etc. Mobile renderer 54 divides the target point clouds of the image into several objects, which are then placed into the predefined containers. FIG. 4 shows an example of a display 38 of personal computing device 12 displaying an image that includes avatar 122. Returning to FIG. 3, the different containers represent different content of the avatar that are to be rendered (e.g., by GPU 28). Examples of types of containers may include containers for faces, eyes, hair, face-related accessories (e.g., hats, jewelry, etc.), torso, legs, arms, top wear garments, bottom wear garments, outerwear garments, and body-related accessories (e.g., scarfs, gloves, jewelry, etc.) Mobile renderer 54 may be configured to divide the image into any number of containers. In an e-commerce application, mobile renderer 54 may be configured to associate an order number or some other identifier to each of containers 120.

Mobile renderer 54 may be further configured to determine a respective category of content, from among a plurality of categories of content, for each of the n different containers of containers 120. In one example of the disclosure, mobile renderer 54 may be configured to divide the n containers into four categories: a face category of the avatar, a body category of the avatar, a face-related accessories category of the avatar, and a body-related accessories and other accessories category of the avatar. As will be described in more detail below, mobile renderer 54 may use the categories determined for each of the n containers to determine which containers to update, what order to update the containers, and what level of update is to be performed, in response to a user request to make a change to the avatar.

Mobile renderer 54 may be further configured to determine a respective shader program (e.g., shader 1, shader 2 .

..., shader m), from among a plurality of shaders 124, for respective containers of the n containers 120 based on the respective category of the respective container. A shader program is software that is executable by GPU 28 and is configured to control the operation of one or more portions of a graphics rendering pipeline. Shader programs 124 may include software for one or more shader processors contained within GPU 28. The shader processors of GPU 28 may be configured to perform various stages of a graphics processing pipeline, including, but not limited to, vertex shading, tessellation control, tessellation evaluation, geometry shading, and/or fragment shading.

The object code of shader programs 124 may be stored in system memory 32 (FIG. 2). During execution, mobile renderer 54, via a graphics driver for GPU 28, may instruct GPU 28 with information indicating which one of shader programs 124 to execute and the order in which to execute shader programs 124. In response, GPU 28 may execute shader programs 124 in the manner instructed by mobile renderer 54.

A vertex shader program may operate on vertices of primitives (e.g., triangles) of image data of particular containers of the avatar in 3D space. Tessellation control and tessellation evaluation shader programs may control the operation of a tessellation pipeline that may be configured to add additional primitives (e.g., triangles) to a 3D representation of the image data in containers of the avatar. Geometry shader programs may operate on primitives that are output by a tessellation stage of a graphics processing pipeline. Fragment shader programs may operate on fragments (i.e., segments of a rasterized primitives) after the 3D primitives have been rasterized.

Regardless of the type of shader program being executed, mobile renderer 54 may determine a particular shader program to use for each of the n containers 120 based on the content and category of the container. Shaders 124 may be configured to provide a more realistic (e.g., photo realistic) rendering for the types of content that will be rendered in a fashion-related application. As opposed to a gaming application, an accurate real-world representation of fashion items is important for a user when making purchasing decisions. To this end, shaders 124 may be tailored to each type of content in containers 120 so that a more realistic looking output is achieved. For example, shaders 124 may include a shader program configured to more accurately render clothing. A clothing-based shader program may use bump maps, color maps, and texture maps to more accurately represent the color, texture and detail of different fabrics. In this way, a user may more easily discern the difference between different fabric types (e.g., cotton vs. denim vs. silk, etc.).

In some example renderers, all objects may be processed by a generic shader. A generic shader program may be configured to handle many different kinds of components that may be specified as required to render the object (e.g., including components other those needed for a fashion-based application. In accordance with techniques of this disclosure, mobile renderer 54 may use different shaders for each container. For example, to render the body, legs and shoes, mobile renderer 54 may direct the use of a more simple shader which only deals with the point cloud and diffused lighting of the materials to render the components. Whereas, for top, bottom, jacket, and dress containers, mobile renderer 54 may direct the use of a shader which takes a bump map and/or specular map as extra information to produce for a more realistic fashion look on the apparel in the rendered avatar. For hairstyle containers, shaders 124 may include a shader that uses a 2-pass technique that uses an alpha map as a separate component and renders the hairstyle in two render passes with a depth analysis in order to produce a more complex and translucent hair object without sorting it runtime.

Bump mapping, e.g., as used by the clothing-based shader program, is a technique in rendering for simulating texture (e.g., bumps and wrinkles) on the surface of an object. In this case, the object may be a garment or a fashion accessory. A color map is an array or table of colors used to map pixel values to colors. Different color maps may be used in different shaders for different containers (e.g., skin, hair, eyes, garments, accessories, etc.) to more accurately represent the content of the container. A texture map may define high frequency detail, surface texture, or color information on a rendered object (e.g., a container of the avatar). High resolution textures may provide for a very realistic looking rendering, but may come at the price of speed and memory requirements. In examples of the disclosure, mobile renderer 54 may use shaders 124 that use lower resolution textures in connection with bump maps and color maps in order to provide for a realistic rendering, while maintaining a faster rendering and a lower memory cost.

For some example shaders of shaders 124, lower resolution textures may be used to perform quicker texture mapping. Bump mapping may then be used in the shame shader to enhance realism. Such a technique may be more beneficial than using higher resolution textures because higher resolution textures may require more processing time.

In some examples, mobile renderer 54 may have a shader program that is used for all garments. In other examples, mobile renderer 54 may have separate shader programs for different garments depending on the category (e.g., face or body), and/or depending on the type of fabric (e.g., denim, cotton, silk, polyester, etc.). In general, mobile renderer 54 may be configured to determine shaders on a per-category basis and/or on a per-container basis (e.g., one shader for each category and/or one shader for each container). In other examples, multiple containers of a category, but not all containers of the same category, may share the use of a single shader.

Once mobile renderer 54 has divided the image (e.g., avatar) into the n containers and determined a category and shader for each of the containers, mobile renderer 54 may cause GPU 28 or CPU 24 to independently render the n containers using the determined respective shader programs to create the avatar. In this regard, independent rendering may refer to rendering the image content in each of the containers separately (i.e., without rendering the content of other containers). However, it should be understood that the depth and/or transparency values of the output of the different rendered containers may compared with each other to determine what output is "on top" of the other and will actually be visible in the final scene. In this regard, the techniques of this disclosure may generally render containers that are behind other containers first.

As one example, mobile renderer 54 may send image data related to each of the n containers, as well as information indicating the respective one shaders 124 to use, to GPU 28. Mobile renderer 54 may cause GPU 28 to render each of the n containers independently (e.g., separately) in a specific order using the determined shaders to produce the avatar. Rendering order may be beneficial in terms of how the rendered object appears. For example, consider a situation where a glasses container is rendered before a face container. The resulting rendered image may be erroneous due to transparency in the glasses. Using the container approach of this disclosure, mobile renderer 54 may be configured to render the containers in the a proper order such that the rendered image is drawing correctly. One example order of containers may be: body, leg, shoe, head, eyewear, earrings, bottom, top/dress, jacket, hair, etc.

For example, a hair container of containers 120 may include the point cloud of a hair element and of the avatar. In this context, a point cloud may refer to a set of vertices or points that define a polygon mesh (e.g., triangle mesh) that represents a 3D model of the container. The point cloud may be rendered by GPU 28 to create a 2D image of the 3D model. The hair container may also include texture information for the hair element. Texture information may define a pattern and/or color map of the hair element. In general, the texture information may be generally used to determine the output color of pixels of the container, while the point cloud may determine the overall size and shape of the element of the container.

As described above, the hair container may be bound to hair-specific shaders of shaders 124. Mobile renderer 54 may cause GPU 28 to render the hair container after a head container (e.g., face and eyes) is drawn to maintain a depth buffer (e.g., zbuffer) accuracy, thus keeping the content of the hair container separate from the content of the head container to make such containers easily changeable from a mix and match point of view. A depth buffer (zbuffer) indicates the relative depth of elements of the rendered image from the point of view of the camera angle of the user. In general, mobile renderer 54 may cause containers that are further away from the user (e.g., as indicated by depth values in the z buffer) to be rendered first compared to containers that are closer to the user (e.g., as indicated by depth values in the z buffer).

Mobile renderer 54 may also be configured to receive an input 132 from a user 130. The input may be received via user interface 34 of personal computing device 12. The input may include a request for a change to one or more containers of the n containers. A user may provide an input that request a change to any component of the avatar (e.g., any apparel, accessory, user face, avatar, or body shape). In response to the user input 132, mobile renderer 54 may be configured to use a rule-based render algorithm 128 to determine which containers are to be updated based on the content requested to be changed. Mobile renderer 54 may then re-render the affected containers in accordance with the change and display the avatar including the re-rendered containers.

According to one aspect of the disclosure, render algorithm 128 may be configured to determine the minimal changes needed for other related containers, in addition to the directly affected container related to the requested change, based on the categories of other containers in order to maintain consistency of the overall environment. For example, a change to a face-related accessory may benefit from not only the re-rendering of the face-related accessory container (e.g., earrings), but other face category containers (e.g., face and hair) may also be re-rendered.

Mobile renderer 54 may also determine the update type of the re-rendering needed based on the user input. That is, some updates may only need any update to the texture of the container. Other types of updates may need only an update of the point cloud of the container. Still other types of update may need updates to both the point cloud and texture of the container. Mobile renderer 54 may communicate the update type to GPU 28 to effect the desired change.

As one example, if the user changes the face of their avatar, depending on the face complexion change, mobile renderer 54 may determine that only updates to the texture of the body container is needed. Mobile renderer 54 may cause a refresh (e.g., both point cloud and texture updates) of all the face-related accessories, which may include an update of the containers with the real-time generated morphed accessories for the new user face at the server side (e.g., network computing devices 18).

In general, when a user changes a component that affects related objects present in rendering environment, mobile renderer 54 uses the rule-based engine of render algorithm 128 to determine the required minimal changes in other components and performs the entire change in a most optimized way to increase responsiveness of the application. The rule-based engine of render algorithm 128 minimizes the changes needed for a user action in the mix and match of apparels & accessories. As one example, mobile renderer 54 may divide apparel containers into three main types: top wear, bottom wear and jackets (e.g., outerwear). When a user requests any changes to any of those containers by changing a top, bottom or jacket, the rule-based engine of render algorithm 128 determines if any changes are needed in the other containers or not.

Below is an example of pseudo code for a rules-based engine or render algorithm 128:

```
ChangeObject(container i, object obj){
if i.type == face:
loadFace(obj)
reload only the point cloud for all containers having parent type FaceRelated objects.
reload only texture of the body
if i.type == shoe:
change(leg for the shoe.type)
if i.type == body:
loadBodyObjectOnly(obj)
reload only the point cloud for all containers having parent type BodyRelated objects .
if i.type == Top:
if(last apparels == Dress):
loadTop(obj)
loadDefaultBottom(Top.type)
removeJacket( )
else:
loadTop( )
if(Top.type != Bottom.type): // Tuck in or tuck out
reload BottomPointCloudOnlyForTopType
removeJacket( )
if i.type == Bottom:
if(last apparels == Dress):
loadBottom(obj)
loadDefaultTop( ) // here we don't need Bottom.type because default top is always tucked out
removeJacket( )
else:
loadBottom(Top.type)
removeJacket( )
if i.type == Jacket:
if(last apparels == Dress):
loadDefaultTopForJacket(obj)
loadDefaultBottomForJacket( )
loadJacket(obj)
else:
loadTopPointCloudForJacket( )
loadBottomPointCloudForJacket( )
loadJacket( )
if i == any other categories:
loadContainer(i,obj)
}
```

For example, consider a situation where a dress was previously rendered on a female avatar. The dress does not require a separate bottom wear to be present in the bottom ware container. In this example, the user then decides to change the dress to a normal top at waist length. In response, the rule-based engine of render algorithm 128 may analyze the requested change and update the bottom wear container to by re-rendering a default bottom wear (e.g., a skirt) for the bottom wear container. As another example, when the user inputs a request to place a jacket on a particular top, mobile renderer 54 may determine that the top wear container may require a point cloud update type based on simulation complexity. In this case, the rule-based engine of render algorithm 128 may cause an update to the top wear container as well. Similarly, when user changes the avatar face or changes the body measurements, the rule-based engine of render algorithm 128 may cause an update to the allocated accessories containers based on the face-related and body-related accessories category for each container.

Figure 5:
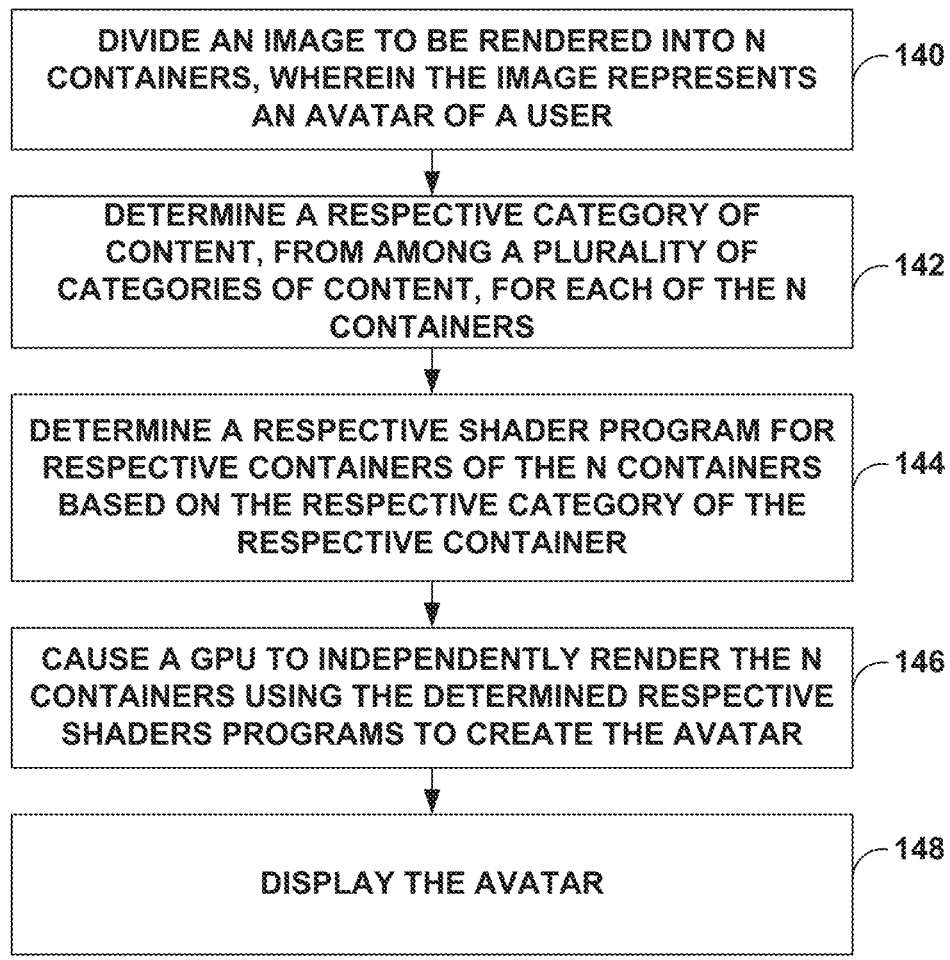
FIG. 5 is a flowchart illustrating example operations of displaying an avatar.

FIG. 5 is a flowchart showing the example operation of a processor (e.g., CPU 24 or GPU 28) executing mobile renderer 54 of this disclosure. CPU 24 may be configured to divide an image to be rendered into n containers, wherein the image represents an avatar of a user (140). CPU 24 may be further configured to determine a respective category of content, from among a plurality of categories of content, for each of the n containers (142), and determine a respective shader program for respective containers of the n containers based on the respective category of the respective container (144). CPU 24 may be further configured to cause GPU 28 to independently render the n containers using the determined respective shader programs to create the avatar (146), and display the avatar (148).

In another example of the disclosure, CPU 24 may be configured to receive an input from the user that requests a change to a first container of the n containers, cause GPU 28 to re-render the first container in accordance with the change, and display the avatar including the re-rendered first container. In a further example, CPU 24 may be configured to determine, based on the respective category of content associated with the first container, other containers of the n containers to update based on the input in order to display the change requested by the input, re-render only the first container and the determined other containers, and display the avatar including the re-rendered first container and the re-rendered determined other containers.

In another example of the disclosure, CPU 24 may be configured to determine a minimal update to the determined other containers based on the respective category of content associated with the first container. In one example, the minimal update is one of a point cloud only update, a texture only update, or a point cloud and texture update.

In another example of the disclosure, in order to cause GPU 28 to independently render the n containers using the determined respective shader programs to create the avatar, CPU 24 may be further configured to cause GPU 28 to independently render the n containers in a predetermined order using the determined respective shader programs to create the avatar.

The techniques of this disclosure may be implemented in a wide variety of computing devices. Any of the described units, modules or components may be implemented together or separately as discrete but interoperable logic devices. Depiction of different features as applications or units is intended to highlight different functional aspects and does not necessarily imply that such applications or units must be realized by separate hardware or software components. Rather, functionality associated with one or more applications or units may be performed by separate hardware or software components, or integrated within common or separate hardware or software components.

The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry. The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random access memory (RAM), read-only memory (ROM), non-volatile random access memory (NVRAM), electrically erasable programmable read-only memory (EEPROM), FLASH memory, magnetic media, optical media, or the like that is tangible. The computer-readable storage media may be referred to as non-transitory. A server, client computing device, or any other computing device may also contain a more portable removable memory type to enable easy data transfer or offline data analysis. The instructions may be executed to support one or more aspects of the functionality described in this disclosure.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the devices, systems, and methods in accordance with the description provided in this disclosure are provided below.

What is claimed is:

1. A method of virtual representation creation, the method comprising:
dividing an image to be rendered into n containers, wherein the image represents an avatar of a user, wherein the avatar is a virtual representation of the user;
determining a respective category of content, from among a plurality of categories of content, for each of the n containers;
determining a respective shader program, from among a plurality of shader programs, for each respective container of the n containers, wherein determining the respective shader program is based on the respective category of the respective container, wherein the respective category includes one of a face category of the avatar, a body category of the avatar, a face-related accessories category of the avatar, and a body-related accessories and other accessories category of the avatar;
independently rendering the n containers using the determined respective shader programs according to a rule-based engine to create the avatar, wherein the rule-based engine renders a container of the n containers based on a user request; and
displaying the avatar.

2. The method of claim 1, further comprising:
receiving an input from the user that requests a change to a first container of the n containers;
re-rendering the first container in accordance with the change; and displaying the avatar including the re-rendered first container.

3. The method of claim 2, further comprising:
determining, based on the respective category of content associated with the first container, other containers of the n containers to update based on the input in order to display the change requested by the input;
re-rendering only the first container and the determined other containers; and
displaying the avatar including the re-rendered first container and the re-rendered determined other containers.

4. The method of claim 3, further comprising:
determining a minimal update to the determined other containers based on the respective category of content associated with the first container.

5. The method of claim 4, wherein the minimal update is one of a point cloud only update, a texture only update, or a point cloud and texture update.

6. The method of claim 1, wherein independently rendering the n containers using the determined respective shader programs according to the rule-based engine to create the avatar comprises:
independently rendering the n containers in a predetermined order using the determined respective shader programs to create the avatar.

7. The method of claim 6, further comprising:
rendering a face container of the n containers before rendering a hair container of the n containers.

8. The method of claim 1, wherein independently rendering the n containers using the determined respective shader programs according to the rule-based engine to create the avatar comprises:
rendering each of the n containers separately without rendering the content of others of the n containers.

9. An apparatus configured for virtual representation creation, the apparatus comprising:
a memory configured to store an image; and
one or more processors in communication with the memory, the one or more processors configured to:
divide the image to be rendered into n containers, wherein the image represents an avatar of a user, wherein the avatar is a virtual representation of the user;
determine a respective category of content, from among a plurality of categories of content, for each of the n containers;
determine a respective shader program, from among a plurality of shader programs, for each respective container of the n containers, wherein determining the respective shader program is based on the respective category of the respective container,. wherein the respective category includes one of a face category of the avatar, a body category of the avatar, a face-related accessories category of the avatar, and a body- related accessories and other accessories category of the avatar;
independently render the n containers using the determined respective shader programs according to a rule-based engine to create the avatar, wherein the rule-based engine renders a container of the n containers based on a user request; and
display the avatar.

10. The apparatus of claim 9, wherein the one or more processors are further configured to:
receive an input from the user that requests a change to a first container of the n containers;
re-render the first container in accordance with the change; and
display the avatar including the re-rendered first container.

11. The apparatus of claim 10, wherein the one or more processors are further configured to:
determine, based on the respective category of content associated with the first container, other containers of the n containers to update based on the input in order to display the change requested by the input;
re-render only the first container and the determined other containers; and
display the avatar including the re-rendered first container and the re-rendered determined other containers.

12. The apparatus of claim 11, wherein the one or more processors are further configured to:
determine a minimal update to the determined other containers based on the respective category of content associated with the first container.

13. The apparatus of claim 12, wherein the minimal update is one of a point cloud only update, a texture only update, or a point cloud and texture update.

14. The apparatus of claim 9, wherein to independently render the n containers using the determined respective shader programs according to the rule-based engine to create the avatar, the one or more processors are further configured to:
independently render the n containers in a predetermined order using the determined respective shader programs to create the avatar.

15. The apparatus of claim 14, wherein the one or more processors are further configured to:
render a face container of the n containers before rendering a hair container of the n containers.

16. The apparatus of claim 9, wherein the one or more processors include a central processing unit and a graphics processing unit.

17. The apparatus of claim 9, wherein to independently render the n containers using the determined respective shader programs according to the rule-based engine to create the avatar, the one or more processors are configured to:
render each of the n containers separately without rendering the content of others of the n containers.

18. A non-transitory computer-readable storage medium storing instructions that, when executed, cause one or more processors to:
divide the image to be rendered into n containers, wherein the image represents an avatar of a user, wherein the avatar is a virtual representation of the user;
determine a respective category of content, from among a plurality of categories of content, for each of the n containers;
determine a respective shader program, from among a plurality of shader programs, for each respective container of the n containers, wherein determining the respective shader program is based on the respective category of the respective container, wherein the respective category includes one of a face category of the avatar, a body category of the avatar, a face-related accessories category of the avatar, and a body-related accessories and other accessories category of the avatar;
independently render the n containers using the determined respective shader programs according to a rule-based engine to create the avatar, wherein the rule-based engine renders a container of the n containers based on a user request; and display the avatar.

* * * * *